United States Patent
Frommann et al.

(10) Patent No.: US 9,802,540 B2
(45) Date of Patent: Oct. 31, 2017

(54) PROCESS FOR REPRESENTING VEHICLE SURROUNDINGS INFORMATION OF A MOTOR VEHICLE

(71) Applicant: GM GLOBAL TECHNOLOGY OPERATIONS LLC, Detroit, MI (US)

(72) Inventors: Markus Frommann, Bingen am Rhein (DE); Oleg Mazur, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 14/722,759

(22) Filed: May 27, 2015

(65) Prior Publication Data

US 2015/0360614 A1    Dec. 17, 2015

(30) Foreign Application Priority Data

Jun. 12, 2014    (DE) .......................... 10 2014 008 687

(51) Int. Cl.
*H04N 7/18*    (2006.01)
*B60R 1/00*    (2006.01)
*B60K 35/00*    (2006.01)

(52) U.S. Cl.
CPC .............. *B60R 1/00* (2013.01); *B60K 35/00* (2013.01); *H04N 7/181* (2013.01); *B60R 2300/105* (2013.01); *B60R 2300/802* (2013.01)

(58) Field of Classification Search
CPC .............. B60R 1/00; B60R 2300/105; B60R 2300/802; B60K 35/00; H04N 7/181

(Continued)

(56) References Cited

U.S. PATENT DOCUMENTS 8,994,520 B2    3/2015    Stählin et al.
2007/0053551 A1*   3/2007    Kubo ....................... B60R 1/00
                                                                    382/106

(Continued)

FOREIGN PATENT DOCUMENTS

DE         198 16 054 A1    10/1998
DE    10 2004 009 364 A1    10/2005

(Continued)

*Primary Examiner* — Allen Wong
(74) *Attorney, Agent, or Firm* — John A. Miller; Miller IP Group, PLC

(57) ABSTRACT

The invention relates to a process for representing vehicle surroundings information of a motor vehicle, wherein the process comprises the following steps:
  recording a front surrounding environment of a vehicle by at least two cameras provided on a vehicle front end of the motor vehicle;
  detecting objects within the recorded front surrounding environment;
  if at least one object is detected within the front surrounding environment, determining a field of view of a driver of the motor vehicle and making a comparison to determine whether the object detrimentally affects the field of view of the driver of the motor vehicle;
  if the field of view of the driver is detrimentally affected by the detected object, acquiring information from the recorded front surrounding environment that is not within the field of view of the driver of the motor vehicle; and
  providing a perspective representation of the acquired information in the determined field of view of the driver.

13 Claims, 2 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2007/0102214 A1* | 5/2007 | Wittorf .................... | B60Q 1/50 180/167 |
| 2009/0009309 A1* | 1/2009 | Matsuoka .............. | G08B 21/06 340/439 |
| 2010/0030474 A1 | 2/2010 | Sawada | |
| 2011/0025584 A1* | 2/2011 | Nishigasako .......... | G02B 27/01 345/76 |
| 2014/0362195 A1* | 12/2014 | Ng-Thow-Hing . | G06K 9/00791 348/51 |
| 2015/0103159 A1* | 4/2015 | Shashua ............. | G06K 9/00798 348/118 |

FOREIGN PATENT DOCUMENTS

| | | |
|---|---|---|
| DE | 10 2012 219 280 A1 | 4/2014 |
| DE | 10 2012 219 735 A1 | 4/2014 |

\* cited by examiner

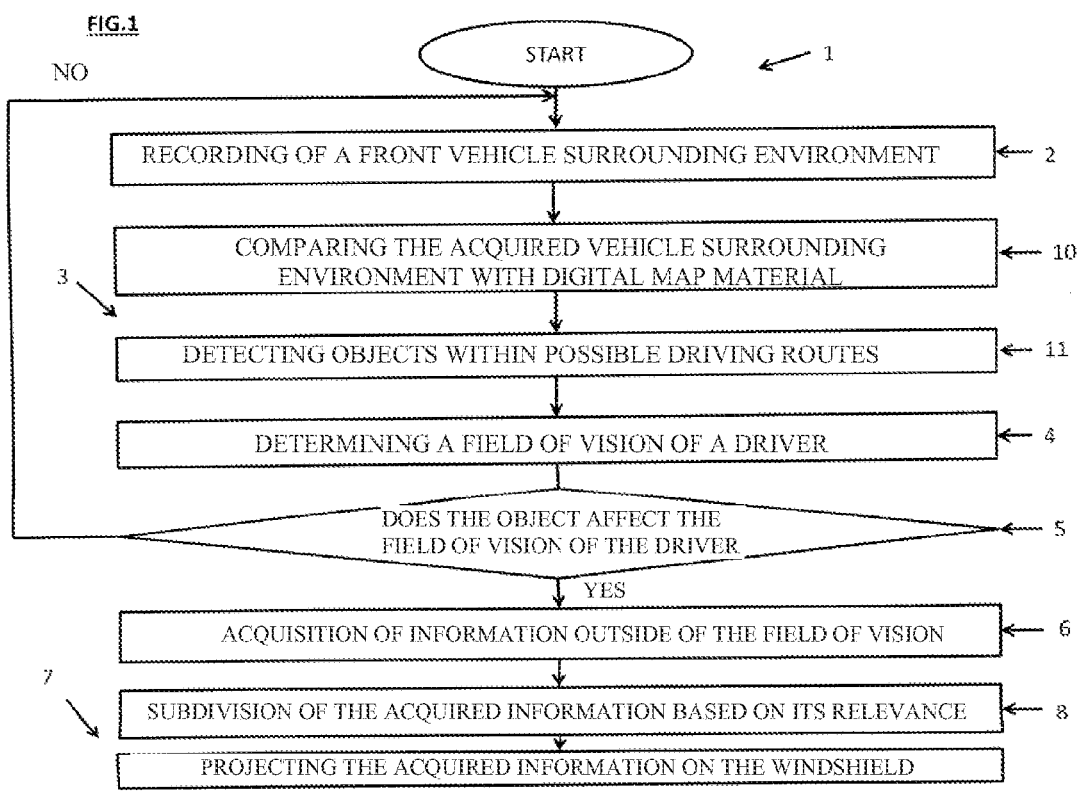

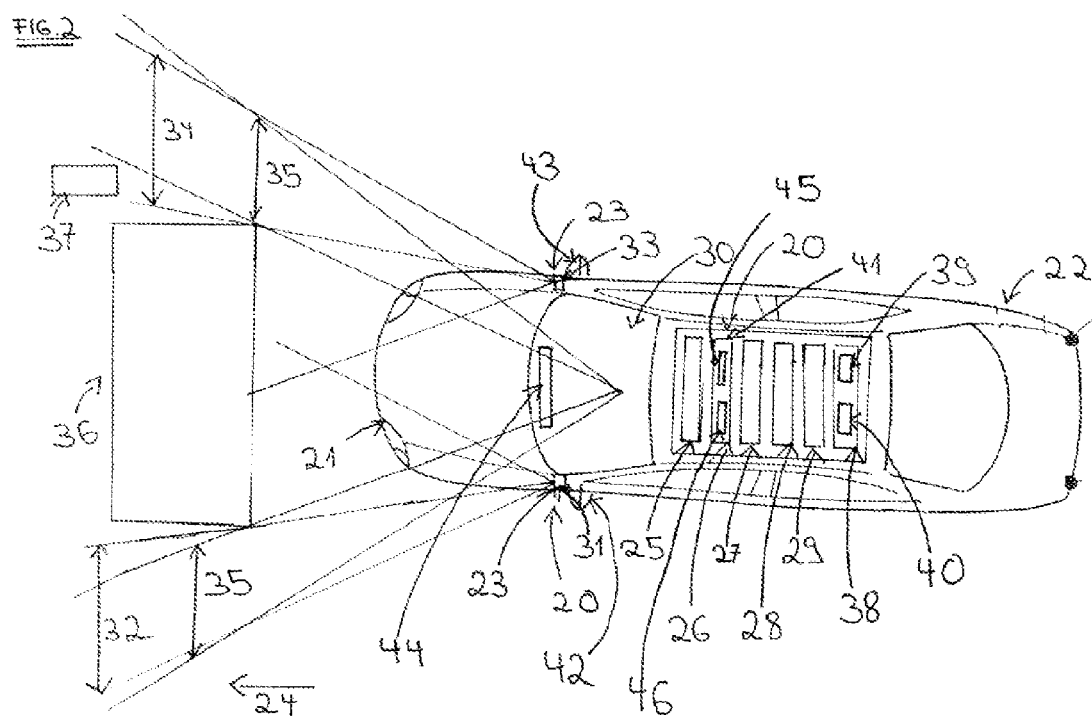

PROCESS FOR REPRESENTING VEHICLE SURROUNDINGS INFORMATION OF A MOTOR VEHICLE

The invention relates to a process for representing vehicle surroundings information of a motor vehicle, in particular to a process for making vehicle surroundings information from a hidden surrounding environment area of a motor vehicle visible to a driver of the motor vehicle.

When driving a motor vehicle, the driver generally relies on information on the nearer surrounding environment of his motor vehicle. This is the case particularly when driving through narrow passages or during parking maneuvers. For this purpose, camera systems have been developed that provide a larger field of view to the driver by means of a monitor installed in the motor vehicle, and thus allow monitoring of a surrounding environment of a motor vehicle that is not directly visible.

From the publication DE 2004 009 364 A1 a visual system for a motor vehicle is known, which consists of four video cameras each of which is installed at one of the four corners of the motor vehicle. Via two circuit elements, the video images from the front or rear video cameras are placed simultaneously on two LCD displays arranged on the dashboard, so that the driver is able to look ahead at the traffic situation around the corner, before turning or backing out of an alley.

The aim of the present invention is to present a process for representing vehicle surroundings information by means of which a driver of the motor vehicle can be assisted in the case of a limited field of view caused, for example, by motor vehicles traveling ahead.

According to an embodiment of the invention, this aim is achieved by a process for representing vehicle surroundings information of a motor vehicle, which comprises the following steps; thus, a front vehicle surrounding environment is recorded by at least two cameras arranged in the area of a vehicle front end of the motor vehicle, and subsequently objects within the recorded vehicle surrounding environment are detected. If, in the process, at least one object has been detected within the vehicle surrounding environment, then a field of view of a driver of the motor vehicle is determined, and moreover a comparison is made in order to determine whether the object detrimentally affects the field of view of the driver of the motor vehicle. If the detected object detrimentally affects the field of view of the driver, then information within the recorded vehicle surrounding environment is acquired, information which is not within the field of view of the motor vehicle. The acquired information is then represented in a perspective view in the determined field of view of the driver.

The basic idea thus is to complete the forward view of a driver of a motor vehicle—if said view is partially blocked due to an obstacle arranged in the area ahead of the traveling vehicle—by a perspective representation of hidden information in the field of view of the driver. Such obstruction of the view exists, for example, when a certain object is no longer jointly acquired by a left and right camera, which are preferably video cameras. Here, the two cameras are preferably arranged as far from the vehicle center of the motor vehicle as possible, for example, on the two external outside mirror housings.

Such a process has the advantage that with it a process for representing vehicle surroundings information is presented, by means of which a driver of the motor vehicle can be assisted in the case of a limited field of view caused, for example, by motor vehicles, in particular trucks, traveling ahead. Thus, the driver of the motor vehicle is put in a position in which he is aware of obstacles that are not visible or the like, which would otherwise be hidden by the detected object within the field of view of the driver of the motor vehicle. This in turn results in a decreased accident risk and thus in increased driving safety, since the driver is able to deal with the obstacle early on and possibly start driving maneuvers that may be needed, in spite of the fact that the obstacle is not yet in his field of view, and the driver can consequently adjust early to changes in his surroundings.

The acquired information can here be information on vehicles and/or pedestrians and/or traffic signs that are present in the recorded surrounding environment of the vehicle but not located within the field of view of the driver. Furthermore, the acquired information can also be, for example, hidden traffic lights or construction sites with or without changes in the routing and configuration of the streets and roads and corresponding road markings, so that the acquired information contains all incidental and temporary information that is currently hidden but represents potential obstacles and could consequently require corresponding driving maneuvers.

The step of the perspective representation of the acquired information in the determined field of view of the driver can here include a projection of the acquired information on a windshield of the motor vehicle or a representation of the acquired information on a monitor integrated in the windshield. The monitor integrated in the windshield can here be in the form of a flexible OLED film, for example. Organic light emitting diodes (OLED) are understood to mean a light emitting luminescent thin-layer material made of organic semiconducting materials, which differs from an inorganic light emitting diode in that the current density and the light density are lower, but no monocrystalline materials are required. Due to the material properties, in particular due to a more flexible design in comparison to other technologies, OLEDs in the form of an OLED film can be used as a flexible, spatially curved monitor or as electronic paper. The information acquired can here moreover be projected on the windshield in the area of an obstruction, caused by the detected object, of the field of view of the driver of the motor vehicle. This has the advantage that the hidden information is provided for the driver in the correct position in terms of perspective, and said driver can consequently obtain from the representation precise information concerning where, relative to the motor vehicle, the acquired information is currently located.

According to an embodiment, the step of the perspective representation of the acquired information in the field of view of the driver can moreover comprise the following steps: thus, the acquired information is subdivided into a group of acquired information of high relevance and a group of acquired information of low relevance, and subsequently only the acquired information of the group of acquired information of high relevance is represented in the field of view of the driver. High relevance here means that a high traffic risk arises from the acquired information. Low relevance on the other hand means that only little or no traffic risk arises from the acquired information. The fact that only the acquired information of the group of acquired information of high relevance is represented has the advantage that the driver of the motor vehicle does not have to deal with obstacles from which practically no danger arises, as a result of which unnecessary sensory overload and distraction of the driver from the traffic events can be prevented. Examples of information of high relevance are pedestrians, bicyclists, oncoming motor vehicles or motorcycles, hidden traffic lights and traffic signs, construction sites or changes in the routing and configuration of the streets and roads, and road markings.

The step of detecting objects within the recorded surrounding environment of the vehicle can also comprise the following steps; thus, the recorded surrounding environment of the vehicle is compared with the digital map material for the determination of possible routes, and only objects within the possible routes are detected. This also has the advantage that only information on obstacles that are at least partially blocked from view arranged in the area ahead of the traveling vehicle are in fact represented, as a result of which unnecessary sensory overload and distraction of the driver from the traffic events can be prevented, and the driver comfort can be further increased.

In addition, the process can moreover comprise the following steps: thus, additional information pertaining to the acquired information is determined, and the additional information together with the acquired information is represented in the field of view of the driver. The additional information can be made available to the driver of the motor vehicle, for the correct evaluation and assessment of the at least partially hidden obstacles arranged in the area in front of the moving vehicle, so that said driver can initiate in a targeted manner the steps required to avoid a hazardous situation. Here, the additional information can be a size of the acquired information and/or a distance of the acquired information from the motor vehicle. Thus, as a rule, the size of the obstacle that is at least partially blocked from view arranged in the area in front of the moving vehicle and the distance of the obstacle from the motor vehicle are sufficient in order to be able to correctly assess the potential source of risk due to the obstacle. However, the additional information moreover can also be any additional information pertaining to the acquired information that could be relevant for the evaluation of the potential source of risk.

The determination of the field of view of the driver of the motor vehicle can here include an acquisition of a face orientation of the driver and a subsequent calculation of the field of view of the driver of the motor vehicle from the acquired face orientation. The field of view of the driver of the motor vehicle can here be determined by optical tracking, for example. Thus, an optical tracker is understood to mean, for example, an apparatus that, measures the position and orientation of a user. Such a system can consist, for example, of one or more cameras that record markings on the user or, for example, using a VR headset. From the position of the markings on the camera images and the relative positions of the cameras with respect to one another, the position of the marking in space and thus that of the user, in particular the point of sight of the user, and consequently also the field of view of the user, can be calculated. Furthermore, conversely, the camera can also be attached on the head of a user, in particular by means of eyeglasses, and then it orients itself on fixed markings in space in order again to calculate the field of view of the user therefrom.

In a further embodiment of the invention, a computer program is also provided which, when it is executed in a computer unit of a motor vehicle, instructs the computer unit to carry out an above described process.

In addition, a computer-readable medium is provided, on which such a computer program is stored.

Such a computer program has the advantage that with it a process for representing vehicle surroundings information can be implemented, by means of which a driver of the motor vehicle can be assisted in the case of a limited field of view caused, for example, by motor vehicles, in particular tracks, traveling ahead. Thus, the driver of the motor vehicle is put in a position in which he is aware of obstacles that are not visible or the like, which would otherwise be hidden by the detected object within the field of view of the driver of the motor vehicle. This in turn results in a decreased accident risk and thus in increased driving safety, since the driver is able to deal with the obstacle early on and possibly start driving maneuvers that may be needed, in spite of the fact that the obstacle is not yet in his field of view, and the driver can consequently adjust early to changes in his surroundings.

In an additional embodiment of the invention, a device for representing vehicle surroundings information of a motor vehicle is indicated additionally. The device here comprises at least two cameras arranged in the area of the vehicle front end of the motor vehicle for recording a front surrounding environment of the vehicle. Moreover, the device comprises a first means for detecting objects within the recorded vehicle surrounding environment, a second means for determining a field of view of a driver of the motor vehicle, a third means for the comparison, in order to determine whether a detected object detrimentally affects the field of view of the driver of the motor vehicle, an evaluation unit for acquiring information within the recorded vehicle surrounding environment, information which is not within the field of view of the motor vehicle, if the field of view of the driver of the motor vehicle is detrimentally affected by the detected object, and a representation means for the perspective representation of the acquired information in the field of view of the driver.

Such a device has the advantage that with it a representation of vehicle surroundings information can be implemented, by means of which a driver of the motor vehicle can be assisted in the case of a limited field of view caused, for example, by motor vehicles, in particular trucks, traveling ahead. In particular, the device here is designed to complete the view forward of a driver of a motor vehicle, if said view is partially blocked as a result of an obstacle arranged in the area ahead of the traveling vehicle, by means of the perspective representation of hidden information in the field of view of the driver. Such obstruction of the view exists, for example, when a certain object is no longer acquired jointly by a left and a right camera, which are preferably video cameras. Thus, the driver of the motor vehicle is put in the position of being aware of invisible obstacles or the like, which would otherwise be hidden by the detected object within the field of view of the driver of the motor vehicle. This in turn results in a decreased accident risk and thus in increased driving safety, since the driver is able to deal with the obstacle early on and possibly initiate driving maneuvers that may be needed, in spite of the fact that the obstacle is not yet in his field of view, and the driver can consequently adjust early to changes in his surroundings.

The acquired information can here again be information on vehicles and/or pedestrians and/or traffic signs that are present in the recorded surrounding environment of the vehicle but not located within the field of view of the driver. Furthermore, the acquired information can also be, for example, hidden traffic lights or construction sites with or without changes in the routing and configuration of the streets and roads and corresponding road markings, so that the acquired information contains all incidental and temporary information that is currently hidden but represents potential obstacles and could consequently require corresponding driving maneuvers.

The second means can also include an acquisition unit for acquiring a face orientation of the driver of the motor vehicle and a computation unit for calculating the field of view of the driver of the motor vehicle from the acquired face orientation. For example, the second means can include an optical tracker. Thus, an optical tracker is understood to mean, for example, a system that measures the position and orientation of a user. Such a system can consist, for example, of one or more cameras that record markings on the user or, for example, via a VR headset. From the position of the markings on the camera images and the relative positions of the cameras with respect to one another, the position of the marking in space and thus that of the user, in particular the point of sight of the user, and consequently also the field of view of the user, can be calculated. Furthermore, conversely, the camera can also be attached on the head of a user, in particular by means of eyeglasses, and then it orients itself on fixed markings in space in order again to calculate the field of view of the user therefrom.

Furthermore, the device can also comprise a second evaluation unit for subdividing the acquired information into a group of acquired information of high relevance and a group of acquired information of low relevance, and the representation means can be designed so as to represent only the acquired information of the group of acquired information of high relevance in a perspective representation in the field of view of the driver. High relevance here means that a high traffic risk arises from the acquired information. Low relevance, on the other hand, means that only little or no traffic risk arises from the acquired information.

Moreover, the device can comprise a memory for storing digital map material and a third evaluation unit for determining possible driving routes, and the first means can be designed in order to detect only objects within the possible driving routes.

The device can, furthermore, also comprise a fourth means for the acquisition of additional information pertaining to the acquired information, and the representation means can be designed to represent the additional information together with the acquired information in the field of view of the driver. The additional information can be made available to the driver of the motor vehicle, for the correct evaluation and assessment of the at least partially hidden obstacles arranged in the area in front of the moving vehicle, so that said driver can initiate in a targeted manner the steps required to avoid a hazardous situation. Here, the fourth means can comprise sensors in order to acquire the size of the acquired information and/or a distance of the acquired information from the motor vehicle. Thus, as a rule, the size of the obstacle that, is at least partially blocked from view arranged in the area in front of the moving vehicle and the distance of the obstacle from the motor vehicle are sufficient in order to be able to correctly assess the potential source of risk due to the obstacle. However, the additional information moreover can also be any additional information pertaining to the acquired information that could be relevant for the evaluation of the potential source of risk.

In an additional embodiment of the invention, a motor vehicle is provided, in addition, which comprises an above-described device.

Such a motor vehicle has the advantage that in said motor vehicle a representation of motor vehicle surroundings information can be implemented, by means of which a driver of the motor vehicle can be assisted in the case of a limited field of view caused, for example, by motor vehicles, in particular trucks, traveling ahead, in particular, the view forward of a driver of a motor vehicle —if said view is partially blocked due to an obstacle arranged in the area ahead of the traveling vehicle —is completed by a perspective representation of hidden information in the field of view of the driver. Such obstruction of the view exists, for example, when a certain object is no longer jointly acquired by a left and right camera, which are preferably video cameras. Thus, the driver of the motor vehicle is put in a position in which he is aware of obstacles that are not visible or the like, which would otherwise be hidden by the detected object within the field of view of the driver of the motor vehicle. This in turn results in a decreased accident risk and thus in increased driving safety, since the driver is able to deal with the obstacle early on and possibly start driving maneuvers that may be needed, in spite of the fact that the obstacle is not yet in his field of view, and the driver can consequently adjust early to changes in his surroundings.

Here, in each case, one of the at least two cameras can be arranged on the two outside mirrors of the motor vehicle, said cameras are consequently arranged in order to ensure that the area ahead of the traveling vehicle can be recorded as comprehensively as possible by the ranges of vision of the two cameras.

Moreover, the windshield can comprise an image display system which is formed by a plurality of light emitting diodes, on which the acquired information is projected. Organic light emitting diodes (OLED) are understood to mean a light emitting luminescent thin-layer component made of organic semiconducting materials, which differs from an inorganic light emitting diode in that the current density and the light density are lower, but no monocrystalline materials are required. Due to the material properties, in particular due to a more flexible design in comparison to other technologies, OLEDs in the form of an OLED film can be used as a flexible, spatially curved monitor or as electronic paper. The representation means here can be further developed in order to project the acquired information on the windshield in the area of an obstruction, caused by the detected object, of the field of view of the driver of the motor vehicle, that is to say to comprise a device for projecting the acquired information on the windshield of the motor vehicle.

In summary, it should be noted that with the present invention a process for representing vehicle surroundings information is provided, by means of which a driver of the motor vehicle can be assisted, in the case of a limited field of view caused, for example, by motor vehicles, in particular trucks, driving ahead.

Thus, the driver of the motor vehicle, as a result of the fact that the forward view of a driver of a motor vehicle—if said view is partially blocked due to an obstacle arranged in the area ahead of the traveling vehicle—is completed by a perspective representation of hidden information in the field of view of the driver, for example, by projecting hidden information onto the windshield, is put in the position of being aware of invisible obstacles or the like, which would otherwise be hidden by the detected object, within the field of view of the driver of the motor vehicle.

This in turn results in a decreased accident risk and thus in increased driving safety, since the driver is able to deal with the obstacle early on and possibly start driving maneuvers that may be needed, in spite of the fact that the obstacle is not yet in his field of view, and the driver can consequently adjust early to changes in his surroundings.

The invention will now be explained in further detail in reference to the appended figures.

FIG. 1 shows a flow diagram of a process for representing vehicle surroundings information of a motor vehicle according to embodiments of the invention;

FIG. 2 shows a diagrammatic perspective view of a device for representing motor vehicle surroundings information of a motor vehicle according to embodiments of the invention.

FIG. 1 shows a flow diagram of a process 1 for representing vehicle surroundings information of a motor vehicle according to embodiments of the invention.

As shown in FIG. 1, the process 1 here comprises the following steps: thus, in a first step 2, a front surrounding environment of the vehicle is recorded by at least two cameras arranged in the area of a vehicle front end of the motor vehicle and, in a subsequent step 3, objects are detected within the recorded vehicle surrounding environment. If, in the process, at least one object within the vehicle surrounding environment was detected, in step 4, a field of view of a driver of the motor vehicle is determined and, in a step 5, a comparison is made to determine whether the object detrimentally affects the field of view of the driver of the motor vehicle. If the field of view of the driver of the motor vehicle is detrimentally affected by the detected object, in a step 6, information within the recorded vehicle surrounding environment is acquired, information which is not within the field of view of the motor vehicle. The acquired information is then represented in a perspective view in a step 7 in the field of view of the driver.

Thus, by means of the process 1 according to FIG. 1, the view forward of a driver of a motor vehicle—if said view is partially blocked as a result of an obstacle arranged in the area ahead of the traveling vehicle—can be completed by projecting information that is hidden from view on the windshield. Such obstruction of the view exists, for example, when a certain object is no longer jointly acquired by a left and a right camera.

On the other hand, if in step 5 it is detected that the field of view of the driver of the motor vehicle is not detrimentally affected, steps 1 to 4 are carried out repeatedly.

The acquired information can here be information on other vehicles and/or pedestrians and/or traffic signs that are present in the recorded surrounding environment of the vehicle but not located within the field of view of the driver. Furthermore, the acquired information can also be, for example, hidden traffic lights or construction sites with or without changes in the routing and configuration of the streets and roads and corresponding road markings, so that the acquired information contains all incidental and temporary information that is currently hidden but represents potential obstacles and could consequently require corresponding driving maneuvers.

According to the embodiments of FIG. 1, step 7 of the perspective representation of the acquired information in the field of view of the driver here comprises a projection of the acquired information on the windshield of the motor vehicle. Furthermore, the acquired information can also be represented on a monitor integrated in the windshield.

According to the embodiments of FIG. 1, step 7 of projection of the acquired information on the windshield of the motor vehicle, that is to say the step of the representation of the acquired information in the field of view of the driver, here moreover comprises the following steps: thus, the acquired information, in a step 8, is subdivided into a group of acquired information of high relevance and a group of acquired information of low relevance, and subsequently in a step only the acquired information of the group of acquired information of high relevance is projected on the windshield of the motor vehicle. High relevance here means that a high traffic risk arises from the acquired information. Low relevance on the other hand means that only little or no traffic risk arises from the acquired information. Examples of information of high relevance are pedestrians, bicyclists, oncoming motor vehicles or motorcycles, hidden traffic lights and traffic signs, construction sites or changes in the routing and configuration of the streets and roads, and road markings.

As shown moreover in FIG. 1, the step of detecting objects within the recorded motor vehicle surrounding environment here moreover comprises the following steps: thus, in a step 10, the recorded surrounding environment of the vehicle is compared with digital map material for determining possible driving routes, and, in a step 11, only objects within possible driving routes are detected. This has the advantage that sensory overload and unnecessary distraction of the driver of the motor vehicle caused by irrelevant objects can be prevented.

According to the embodiments of FIG. 1, the acquired information here is projected on the windshield in the area of an obstruction of the field of view of the driver of the motor vehicle, obstruction which is caused by the detected object, as a result of which relevant information is made available to the driver of the motor vehicle in a simplified representation but in the correct position in terms of perspective.

FIG. 2 shows a diagrammatic perspective view of a device 20 for representing vehicle surroundings information of a motor vehicle according to embodiments of the invention.

Here, one can see two cameras 23 arranged in the area of a vehicle front end 21 of a motor vehicle 22, for recording a front surrounding environment of the vehicle, which is symbolized by the arrow provided with the reference numeral 24. Moreover, FIG. 2 shows a first means 25 for detecting objects within the recorded surrounding environment of the vehicle, a second means 26 for determining a field of view of a driver of the motor vehicle 23, a third means 27 for making a comparison to determine whether a detected object detrimentally affects the field of view of the driver of the motor vehicle 23, an evaluation unit 28 for acquiring information within the recorded vehicle surrounding environment, information which is not located in the field of view of the driver of the motor vehicle 23, since the field of view of the driver of the motor vehicle 23 is detrimentally affected by the detected object, and a representation means 29 for the perspective representation of the acquired information in the field of view of the driver.

A range of view of a left camera 30 is symbolized in the area provided with the reference numeral 32, a range of view of a right camera 33 is symbolized by the area provided with the reference numeral 34, and a field of view of a left eye and of a right eye of a driver of the motor vehicle is symbolized by an area provided with the reference numeral 35. As shown in FIG. 2, the field of view 35 of the driver of the motor vehicle 23 is limited here by an object 36 in the front vehicle surroundings. The device 20 is here designed in order to make available to the driver, in a perspective view, information 37 that is hidden by the object 36 within the field of view 35, that is to say to alert the driver in real time to potential sources of risk ahead and information on the surrounding environment.

The acquired information can here again be information on other vehicles and/or pedestrians and/or traffic signs that, are present in the surrounding environment of the vehicle but not located within the field of view of the driver. Furthermore, the acquired information can also be, for example, hidden traffic lights or construction sites with or without changes in the routing and configuration of the streets and roads and corresponding road markings, so that the acquired information contains all incidental and temporary information that is currently hidden but represents potential obstacles and could consequently require corresponding driving maneuvers.

According to the embodiments of FIG. 2, a fourth means 38 is provided moreover here for acquiring additional information pertaining to the acquired information, and the representation means 29 is designed to provide a perspective view of the additional information together with the acquired information in the field of view of the driver. The represented fourth means 38 comprises a first sensor 39 for acquiring a size of the acquired information as well as a distance sensor 40 for acquiring a distance of the acquired information from the vehicle.

According to the embodiments of FIG. 2, the second means 26 here comprises an acquisition unit 45 for acquiring a face orientation of the driver of the motor vehicle and a computation unit 46 for calculating the field of view of the driver from the acquired face orientation. The second means 26 of FIG. 2 here is an optical tracker 41.

One can also see that the left camera 31 is arranged here on a left outside mirror 42 of the motor vehicle and the right camera 33 is arranged on a right outside mirror 43 of the motor vehicle.

In addition, the representation means according to FIG. 2 is designed to project the acquired information on a windshield of the motor vehicle. For this purpose, the windshield 30 according to FIG. 2 comprises an image display system 44, which is formed by a plurality of organic light emitting diodes, on which the acquired information is projected. Organic light emitting diodes (OLED) are understood to mean a light emitting luminescent thin-layer made of organic semiconducting materials, which differs from an inorganic light emitting diode in that the current density and the light density are lower, but, no monocrystallme materials are required. Due to the material properties, in particular due to a more flexible design in comparison to other technologies, OLEDs in the form of an OLED film can be used as a flexible, spatially curved monitor or as electronic paper.

Although at least one embodiment as an example has been shown in the preceding description, various changes and modifications can be made. The mentioned embodiments are only examples and they are not intended to limit the scope of validity, the usability or the configuration in any way. Rather, the preceding description lays out a plan for the implementation of at least one example of an embodiment available to the person skilled in the art, wherein numerous changes can be made in terms of the function and the arrangement of elements described in an embodiment given as an example without leaving the scope of protection of the appended claims and their legal equivalents.

The invention claimed is:

1. A process for representing vehicle surroundings information of a motor vehicle, wherein the process comprises the following steps:
  recording a front surrounding environment of a vehicle by at least two cameras provided on a vehicle front end of the motor vehicle;
  detecting objects within the recorded front surrounding environment, including comparing the recorded front surrounding environment with digital map material for determining possible driving routes and detecting objects only within the possible driving routes;
  if at least one object is detected within the front surrounding environment, determining a field of view of a driver of the motor vehicle and making a comparison to determine whether the object detrimentally affects the field of view of the driver of the motor vehicle;
  if the field of view of the driver is detrimentally affected by the detected object, acquiring information from the recorded front surrounding environment that is not within the field of view of the driver of the motor vehicle; and
  providing a perspective representation of the acquired information in the determined field of view of the driver.

2. The process according to claim 1, wherein the acquired information concerns other motor vehicles and/or pedestrians and/or bicyclists and/or traffic signs that are present in the recorded front surrounding environment but not located within the field of view of the driver of the motor vehicle.

3. The process according to claim 1, wherein the step of providing the perspective representation of the acquired information in the determined field of view of the driver includes a projection of the acquired information on a windshield of the motor vehicle or a representation of the acquired information on a monitor integrated in the windshield.

4. The process according to claim 1, wherein the step of providing the perspective representation of the acquired information in the determined field of view of the driver includes the following steps:
  subdividing the acquired information into a group of acquired information of high relevance and a group of acquired information of low relevance; and
  representing only the acquired information of the group of acquired information of high relevance in the field of view of the driver.

5. The process according to claim 1, wherein the process further comprises the following steps:
  determining additional information pertaining to the acquired information; and
  representing the additional information together with the acquired information in the field of view of the driver.

6. The process according to claim 1, wherein determining a field of view of the driver further comprises the following steps:
  acquisition of a face orientation of the driver of the motor vehicle; and
  calculating the field of view of the driver of the motor vehicle from the acquired face orientation.

7. The process according to claim 1 further comprising using a computer program stored on a non-transitory computer-readable medium which, when it is executed on a computing unit of a motor vehicle, instructs the computing unit to carry out the process.

8. A device for representing vehicle surroundings information of a motor vehicle, which comprises at least two cameras arranged on a vehicle front end of the motor vehicle, for recording a front surrounding environment of the vehicle, wherein the device further comprises a first means for detecting objects within the recorded front surrounding environment including comparing the recorded front surrounding environment with digital map material for determining possible driving routes and detecting objects only within the possible driving routes, a second means for determining a field of view of a driver, a third means for making a comparison to determine whether a detected object detrimentally affects the field of view of the driver of the motor vehicle, an evaluation unit for acquiring information on the recorded front surrounding environment that is not within the field of view of the driver of the motor vehicle, if the field of view of the driver is detrimentally affected by the detected object, and representation means for providing a perspective representation of the acquired information in the determined field of view of the driver.

9. The device according to claim 8, further comprising a fourth means for acquiring additional information pertaining to the acquired information, wherein the representation means is designed to represent the additional information together with the acquired information in the field of view of the driver.

10. The device according to claim 8, wherein the second means comprises an acquisition unit for acquiring a face orientation of the driver of the motor vehicle and a computing unit for calculating the field of view of the driver of the motor vehicle from the acquired face orientation.

11. A motor vehicle including a device comprising at least two cameras arranged on a vehicle front end of the motor vehicle for recording a front surrounding environment of the vehicle, a first means for detecting objects within the recorded front surrounding environment including comparing the recorded front surrounding environment with digital map material for determining possible driving routes and detecting objects only within the possible driving routes, a second means for determining a field of view of a driver, a third means for making a comparison to determine whether a detected object detrimentally affects the field of view of the driver of the motor vehicle, an evaluation unit for acquiring information on the recorded front surrounding environment that is not within the field of view of the driver of the motor vehicle, if the field of view of the driver is detrimentally affected by the detected object, and representation means for providing a perspective representation of the acquired information in the determined field of view of the driver.

12. The motor vehicle according to claim 11, wherein one of the at least two cameras is arranged on at least one of two outer mirrors of the motor vehicle.

13. The motor vehicle according to claim 11, wherein a windshield of the motor vehicle comprises an image display system, which is formed by a plurality of organic light emitting diodes, on which the acquired information is represented and/or the representation means comprises a device for projecting the acquired information on the windshield of the motor vehicle.

* * * * *